United States Patent [19]
Morris

[11] 3,912,045
[45] Oct. 14, 1975

[54] LUBRICATING PUMP
[75] Inventor: Alberto Jorge Morris, Dursley, England
[73] Assignee: R. A. Lister & Company Limited, England
[22] Filed: June 22, 1973
[21] Appl. No.: 372,855

[30] Foreign Application Priority Data
Aug. 31, 1972 United Kingdom............ 40387/72

[52] U.S. Cl............ 184/27 R; 417/554; 123/196 R
[51] Int. Cl........................ F16n 13/02; F01m 1/02
[58] Field of Search.......... 184/7 D, 27 R, 6.28, 6.5; 123/196 R, 139 R; 417/470, 471, 554

[56] References Cited
UNITED STATES PATENTS

| | | | |
|---|---|---|---|
| 1,308,916 | 7/1919 | Porter | 184/27 R |
| 1,396,296 | 11/1921 | Springer | 184/27 R |
| 1,574,181 | 2/1926 | Baker | 184/27 R X |
| 1,669,306 | 5/1928 | Riesner | 184/27 R |
| 2,675,096 | 4/1954 | Hetmann | 184/6.28 |
| 3,479,958 | 11/1969 | Anderson et al. | 417/554 X |

FOREIGN PATENTS OR APPLICATIONS

| | | | |
|---|---|---|---|
| 845,933 | 8/1960 | United Kingdom | 184/27 R |
| 1,055,303 | 4/1959 | Germany | 184/27 R |

Primary Examiner—Manuel A. Antonakas
Attorney, Agent, or Firm—Edward F. Connors

[57] ABSTRACT

A pump intended particularly for pumping lubricant through engines. The pump is easily assembled and caters for changes in the demand for the lubricant automatically without the need for pressure relief valves. The pump has a reciprocable piston moved by an operating member, a pumping stroke of the operating member giving a fixed delivery and that of the piston giving a delivery dependent on the demand for lubricant.

9 Claims, 2 Drawing Figures

LUBRICATING PUMP

This invention relates to a lubricating pump for circulating lubricant, the pump being particularly suitable for circulating lubricant to internal combustion engines.

In providing lubricant for internal combustion engines circulation of lubricating oil is sometimes by pressurised lubricating oil systems and in such systems the flow of oil is dependent on variations in the temperature and pressure of the oil and the clearances on the passages through which the oil passes. It is generally desirable for the oil pressure to be maintained between predetermined limits and the clearances are subject to variation according to the manufacturing tolerances of the components and the amount of wear.

In view of these variations the flow of oil required in order to maintain the desired pressure varies considerably and one way of meeting this problem is to provide a positive displacement lubricating pump with excess flow capacity which makes it necessary to provide a pressure relief valve and the provision of this valve adds to the cost and complexity of the system.

Lubricating systems often use rotary pumps which are driven from the prime mover by gears and include a pressure relief valve. Sometimes a reciprocating pump is used for cheapness and simplicity, the pump being driven from an eccentric on the crankshaft of the engine. However the usual reciprocating pump only delivers oil once every two engine revolutions which can lead to insufficient oil being delivered. Moreover such pumps are usually assembled by screw-threaded or swaged fasteners.

An object of the invention is to provide a lubricating pump suitable for use in circulating oil which overcomes at least some of the disadvantages of existing pumps.

According to the invention a pump for liquids comprising a piston reciprocally movable in a bore, and operating means for moving the piston in the bore, the operating means extending into the bore and being arranged to discharge liquid from the bore when moving in one direction along the bore, and the piston being arranged to discharge liquid from the bore when moving in the opposite direction along the bore, the amount of liquid discharged by said delivery movement of the operating means being fixed, and the amount of liquid discharged by said delivery movement of the piston being variable and dependent on the demand for the liquid.

Preferably the piston is moved in said opposite direction along the bore by biasing means of the plunger the biasing means being located at the opposite end of the plunger.

Conveniently the pump comprises a liquid inlet at one end of the bore, a liquid outlet towards the opposite end of the bore, and a one-way valve for enabling liquid to flow past the piston from the inlet to the outlet, the operating means including a driven operating member which is engageable with the piston.

The biasing means is preferably a spring arranged to exert a biasing force on the plunger to give the desired discharge pressure on the lubricant.

The relative displacements of the operating member and the plunger may be selected according to the maximum and minimum discharge rates of the pump. Further preferred features of the invention appear from the following description of an embodiment of the invention given by way of example only and with reference to the accompanying drawing in which.

Figures 1, 2:
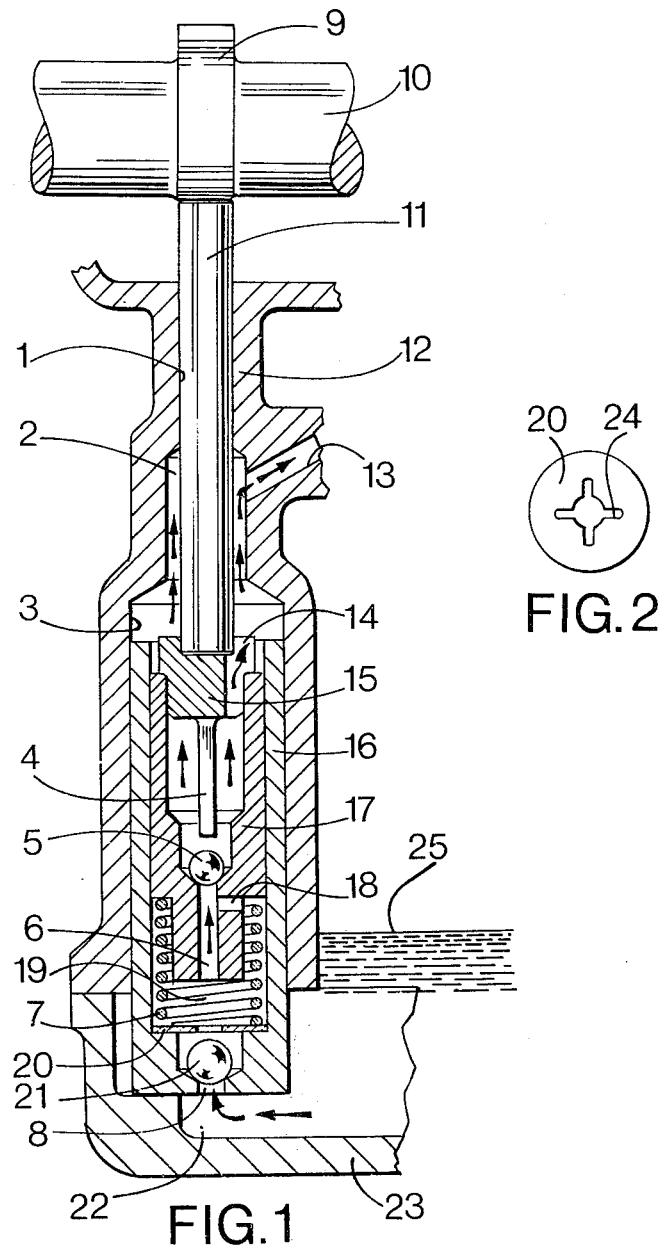
FIG. 1 is a vertical section through a lubricating pump.
FIG. 2 is a plan view of a washer comprising a part of the pump of FIG. 1.

Referring to the drawing the lubricating pump is intended for use in circulating oil through an internal combustion engine, a portion of the crankcase of which is shown at 12 and a portion of the sump cover of which is shown at 23.

The engine drives a camshaft 10 on which is formed an eccentrically-arranged cam 9. The crankcase portion 12 is formed with concentric cylindrical bores 1, 2 and 3 and the components of the pump are located in the bores and are held in position between the crankcase and the sump portions 12 and 23.

A cylindrical tappet 11 is located in the bore 1 and engages the cam surface 9, the lower end of the tappet 11 extending through the bore 2 into the bore 3. As the camshaft 10 is rotated the tappet 11 is reciprocated and the movement of the tappet is transmitted to a composite piston comprising a head 15 having a longitudinal slot 14 and having an upper end of enlarged diameter compared with the lower end. The piston also comprises a body member 17 having an axial bore 6 whose diameter reduces in step-wise manner from its upper end towards its lower end. In the upper, larger diameter portion of the bore 6 is located the lower end of the head 15 and at the junction between an intermediate portion of the bore 6 and the lower smallest diameter portion of the bore 6 is formed a seating for a ball valve 5. A radially-directed opening 18 communicates between the lower portion of the bore 6 and the external periphery of the piston member 17 which, at its lower end, is of reduced external diameter. The head 15 is formed with an axial extension 4 which limits the upward travel of the ball valve 5.

The piston is urged upwardly by biasing means in the form of a spring 7 which is located at its upper end about the lower end of the piston member 17 and engages shoulder on the piston, member 17, and at its lower end the spring 7 engages an apertured washer 20.

A cylindrical sleeve 16 is located within the bore 3 of the crankcase and the inner surface of the sleeve locates about the piston member 17. The lower end of the sleeve 16 is formed with an annular seating for the washer 20, a seating for a ball valve 21, and an inlet opening 8 through which oil is drawn into the pump from an oil reservoir 22 in the sump 23. The lower ends of the piston 17 and the sleeve 16 define a chamber 19 for oil and the sleeve 16 is held in position at its lower end by the sump portion 23.

The washer 20 has an opening 24 of cruciform shape, as shown in FIG. 2, to allow the oil to pass around the ball valve 21 when the latter engages the underside of the washer 20.

The crankcase 12 is further provided with a discharge opening 13 communicating with the bore 3 through which oil is discharged from the pump into the engine.

The direction of flow of oil through the pump is indicated by the arrows.

Operation of the pump is as follows. Assuming that the engine sump is filled with oil in the reservoir 22 to the correct level as indicated by 25 in FIG. 1 and the cam 9 and tappet 11 are initially in the positions shown in FIG. 1, the pump is at the beginning of a relatively lower volume delivery stroke. As the tappet moves downwardly it engages the head 15 and the oil in the chamber 19 below the piston member 17 is compressed thereby closing the ball valve 21 and opening the ball valve 5 and transferring oil through the slot 14 and the discharge opening 13 into the engine, the amount of oil being discharged corresponding to the volume displaced by the tappet 11 as it moves into the bores 2 and 3. The opening 18 allows any air trapped around the lower end of the piston member 17 to be vented as this air would otherwise impair the priming of the pump.

As the tappet 11 begins to move upwardly a relatively higher volume delivery stroke commences and the ball valve 21 opens to admit oil from the reservoir 22 through the inlet opening 8, the ball valve 5 closing and remaining closed during this stroke. The chamber 19 fills with fresh oil and the upward movement of the piston 17 under the action of the spring 7 causes a flow of oil through the outlet 13 equal to the displacement of the piston 17 less the displacement of the tappet 11.

The pressure at which the oil is displaced during upward movement of the tappet 11 remains approximately constant because this pressure is derived from the action of the spring 7. If, as will generally be the case, the engine will not accept all the oil to be delivered at this pressure the piston 17 will not complete its full movement and the piston 17 will remain in an intermediate position until the tappet 11 again moves downwardly against the head 15.

The relative dimensions of the tappet 11 and the piston member 17 are selected according to the characteristics of the engine and the pump. It will be appreciated that the pressure of oil delivered during the upward movement of the piston member 17 is determined by the strength of the spring 7 and no overloading or hydraulic locking can occur, and movement of the piston member 17 will be automatically limited according to the flow requirements of the engine and the back pressure of oil at the outlet 13. On the downward movement of the tappet only a relatively small amount of oil is delivered but hydraulic locking can occur if the amount supplied exceeds the engine requirement. Thus the displacement of oil by the tappet must not exceed the minimum oil flow requirements of the engine whilst the displacement of the piston 17 less the displacement of the tappet 11, during the upward stroke, should exceed the maximum engine oil requirement by at least 50 percent if approximately continuous oil supply at constant pressure is to be achieved.

In practice we have found that the ratio of the crossectional area of the piston to the cross-sectional area of the tappet should be in the range 9:1 to 4:1.

What I claim as my invention and desire to secure by letters patent of the United States is:

1. An internal combustion engine and lubricant pump combination, comprising a crankcase, a lubricant reservoir defined by the crankcase, a removable sump cover provided for said crankcase, a rotatable camshaft drivable by said internal combustion engine, a bore defined by said crankcase, a sleeve located within said bore, non-resilient abutment means on said sump cover engaging one end of said sleeve to retain the sleeve in said bore, a lubricant inlet defined at said one end of said sleeve below the level of lubricant to be contained in said reservoir, a lubricant outlet defined towards the end of said bore opposite to said inlet through which lubricant will pass to lubricate the internal combustion engine, a piston located in said sleeve between said inlet and said outlet, said piston being reciprocally movable in said sleeve, a one-way valve arranged between the inlet and outlet to enable lubricant to flow past said piston from said inlet to said outlet, cam means on said camshaft, an operating rod drivable by said cam means longitudinally of said bore, said operating rod extending into the bore and being operable to move said piston in said sleeve, said operating rod being operable to discharge liquid through said outlet at a rate not exceeding the minimum lubricant demand of said internal combustion engine when moving in one direction in said sleeve, and the piston being operable to discharge liquid through said outlet when moving in the opposite direction in said sleeve, the amount of lubricant discharged by said piston being dependent on the lubricant demand of the internal combustion engine.

2. A combination according to claim 1 wherein the piston is moved in said opposite direction towards said outlet by spring means arranged between the piston and said sleeve.

3. A combination according to claim 2 wherein the piston comprises a head element and a body element, the head element being engaged by said operating rod and the body element being engaged by said spring means, said spring means urging the body element into engagement with the head element.

4. A combination according to claim 3 wherein the head member and the body member are each formed with ducts for the lubricant flowing past the piston.

5. A combination according to claim 1 wherein an axial duct is defined by said piston, said one-way valve being arranged in said axial duct and being arranged to close the axial duct when the piston moves in said opposite direction, an inlet chamber is defined between said liquid inlet and the adjacent end of said piston, and said piston defines a transverse bore upstream of said one-way valve, said transverse bore constituting an airvent interconnecting the axial duct and said inlet chamber to facilitate priming of the pump.

6. A combination according to claim 1 wherein said lubricant inlet is provided with a one-way inlet valve arranged to close said inlet when the operating rod moves the piston in said one direction and arranged to open the inlet when the piston moves in said opposite direction, said inlet valve comprising a seat defined by said sleeve, a valve member engageable with the seat to close said inlet, and stop means for limiting movement of said valve member when the piston moves in said opposite direction, said stop means permitting flow of lubricant past the valve member during movement of the piston in said opposite direction.

7. A combination according to claim 6 wherein the stop means comprises an annular plate defining a seat for said valve member and formed with a plurality of radial by-pass slots to enable lubricant to by-pass the valve member when the valve member engages the seat defined by the plate.

8. A combination according to claim 1 wherein the ratio of the cross-sectional areas of the piston and said operating rod is in the range 9:1 and 4:1.

9. A pump, for delivering lubricant to lubricate an internal combustion engine, comprising a casing, a bore defined by said casing, a piston reciprocally movable in said bore, operating means extending into the bore for moving the piston in one direction along said bore, means for moving the piston in an opposite direction along the bore, a liquid inlet defined at one end of said bore, an inlet chamber defined between said liquid inlet and the adjacent end of said piston, a liquid outlet defined towards the opposite end of said bore, an axial duct defined by said piston through which lubricant will flow between said inlet chamber and said outlet, a one-way valve provided in said axial duct arranged to close the axial duct when the piston moves in said opposite direction, said piston defining a transverse bore upstream of said one-way valve, said transverse bore constituting an air-vent interconnecting the axial duct and said inlet chamber upstream of said one-way valve to facilitate priming of the pump, said operating means being arranged to discharge lubricant through said outlet at a rate not exceeding the minimum lubricant demand at said outlet, and the piston being arranged to discharge lubricant through said outlet when moving in said opposite direction along the bore, the amount of lubricant discharged by movement of the piston in said opposite direction being dependent on the lubricant demand at said outlet.

* * * * *